United States Patent
Neuhaus et al.

(10) Patent No.: US 10,567,059 B2
(45) Date of Patent: Feb. 18, 2020

(54) METHOD AND DEVICE FOR DETERMINING CHANNEL STATE INFORMATION

(71) Applicant: Intel IP Corporation, Santa Clara, CA (US)

(72) Inventors: Holger Neuhaus, Munich (DE);
Yeong-Sun Hwang, Oberhaching (DE);
Rajarajan Balraj, Nuremberg (DE);
Axel Huebner, Munich (DE)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 15/738,086

(22) PCT Filed: May 23, 2016

(86) PCT No.: PCT/EP2016/061543
§ 371 (c)(1),
(2) Date: Dec. 19, 2017

(87) PCT Pub. No.: WO2016/206888
PCT Pub. Date: Dec. 29, 2016

(65) Prior Publication Data
US 2018/0234155 A1 Aug. 16, 2018

(30) Foreign Application Priority Data
Jun. 23, 2015 (DE) .......................... 10 2015 110 066

(51) Int. Cl.
*H04B 7/06* (2006.01)
*H04W 24/10* (2009.01)
(Continued)

(52) U.S. Cl.
CPC ......... *H04B 7/0632* (2013.01); *H04L 1/0026* (2013.01); *H04W 24/10* (2013.01); *H04W 72/042* (2013.01)

(58) Field of Classification Search
CPC .. H04B 7/0632; H04L 1/0026; H04W 72/042; H04W 24/10
See application file for complete search history.

(56) References Cited

U.S. PATENT DOCUMENTS

2012/0113897 A1* 5/2012 Thiele .................... H04B 7/024
370/328
2013/0322276 A1* 12/2013 Pelletier .............. H04W 72/085
370/252
(Continued)

FOREIGN PATENT DOCUMENTS

WO WO-2016206888 A1 12/2016

OTHER PUBLICATIONS

"International Application Serial No. PCT/EP2016/061543, International Search Report dated Jul. 20, 2016", 4 pgs.
(Continued)

*Primary Examiner* — Kiet Tang
(74) *Attorney, Agent, or Firm* — Kowert, Hood, Munyon, Rankin & Goetzel, P.C.

(57) ABSTRACT

A method (300) for determining channel state information includes: receiving (301) a downlink signal, wherein the downlink signal comprises a transport block comprising a plurality of code blocks, each code block of the plurality of code blocks comprising a plurality of resource elements; determining (302) a worst case code block of the plurality of code blocks based on at least one of noise or interference experienced by the plurality of resource elements of the respective code blocks; and determining (303) a metric indicative of a channel state information based on the worst case code block.

22 Claims, 9 Drawing Sheets

(51) Int. Cl.
H04W 72/08 (2009.01)
H04B 7/024 (2017.01)
H04L 1/00 (2006.01)
H04W 72/04 (2009.01)

(56) References Cited

U.S. PATENT DOCUMENTS

2014/0341057 A1* 11/2014 Seo .................. H04W 24/10
　　　　　　　　　　　　　　　　　　　　　　370/252
2015/0092583 A1   4/2015 Balraj et al.

OTHER PUBLICATIONS

"International Application Serial No. PCT/EP2016/061543, Written Opinion dated Jul. 20, 2016", 7 pgs.
Wunder, Gerhard, et al., "System-Level Interfaces and Performance Evaluation Methodology for 5G Physical Layer Based on Non-orthogonal Waveforms", 47th Annual Asilomar Conference on Signals, Systems, and Computers, (Feb. 2, 2013), 9 pgs.

* cited by examiner

METHOD AND DEVICE FOR DETERMINING CHANNEL STATE INFORMATION

CROSS-REFERENCE TO RELATED APPLICATION

This application is a U.S. National Stage Filing under 35 U.S.C. 371 from International Application No. PCT/EP2016/061543, filed on May 23, 2016, now published as WO 2016/206888, which claims priority to German Appliciation No. 102015110066.5, filed Jun. 23, 2015, which applications are incorporated herein by reference in their entirety.

FIELD

The disclosure relates to methods and devices for determining channel state information (CSI). In particular, the disclosure relates to code block based CSI feedback estimation for mobile communication networks such as LTE.

BACKGROUND

Modern cellular networks face the challenge that the demand for data traffic is increasing dramatically. Network operators need to modify their networks to increase the overall capacity.

In both homogenous and heterogeneous networks, the mobile user equipment (UE) is faced not only with varying channel conditions, but also with multiple interfering cells whose signals and channels likewise exhibit time/frequency-selective behavior.

In mobile communication networks such as LTE the transport block (TB) block error rate (BLER) is determined by the highest error rate of any of the code-blocks (CB) contributing to the TB. In the context of e.g. heterogeneous networks, interference localized to certain resource elements (RE) might lead to some CBs within a TB being subject to increased interference. Feedback (FB) reporting methods looking at the overall TB signal quality will be too optimistic leading to increased block error rates (BLER) and ultimately to suboptimum throughput (TP).

It may thus be desirable to provide an improved technique for feedback reporting that provides higher throughput.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
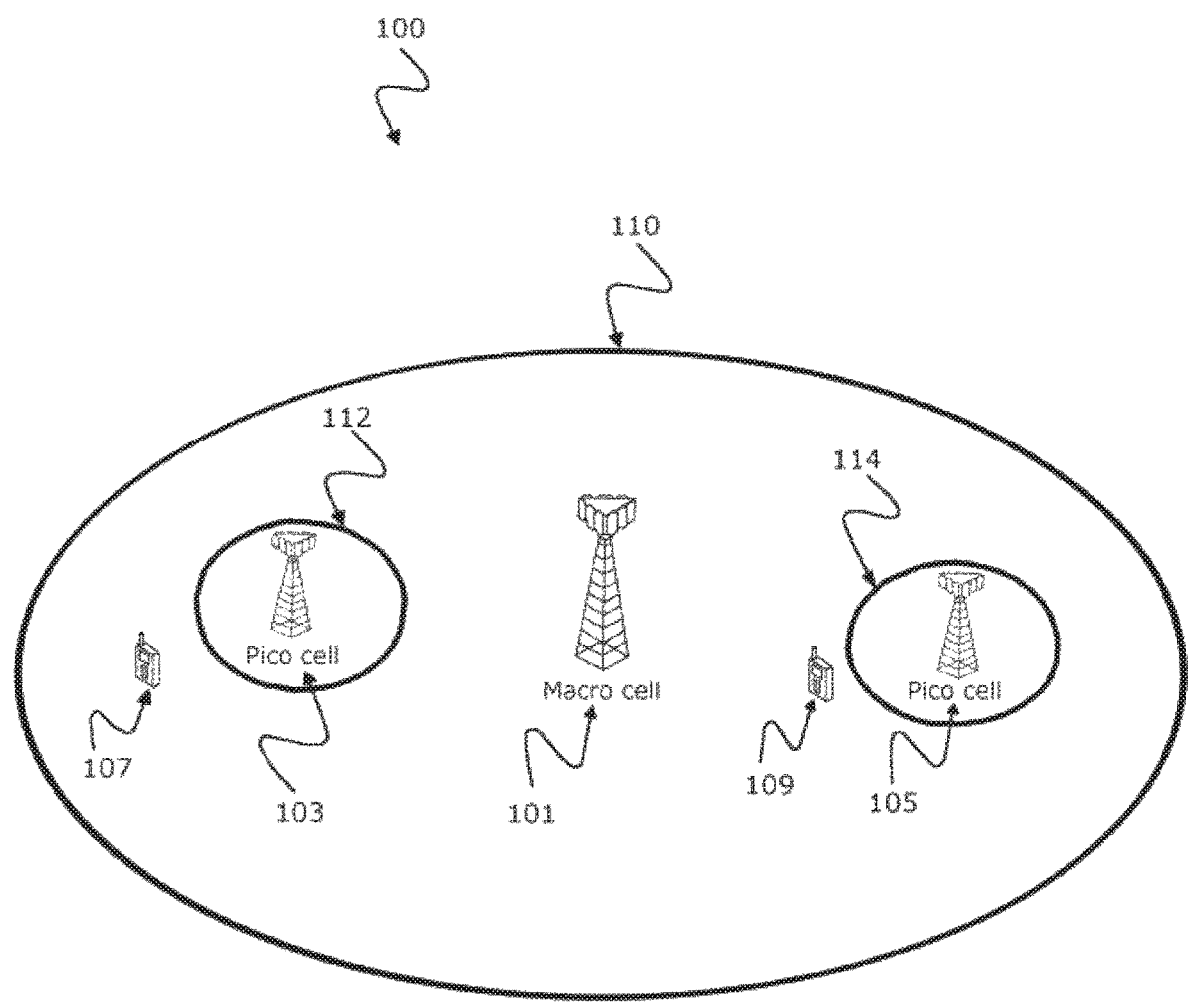
FIG. 1 is a schematic diagram of a heterogeneous network 100 including a macro cell 101 and pico cells 103, 105 according to an interference scenario.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
CRS: Cell specific Reference Signal,
RE: Resource Element,
RB: Resource Block,
PRB: Physical Resource Block,
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
SINR: signal-to-interference and noise ratio,
RB: resource block, e.g., a resource block in frequency direction times slot in time direction,
OFDM: Orthogonal Frequency Division Multiplex,
NodeB: base station,
IRC: Interference Rejection Combining,
(e)ICIC: (enhanced) Inter-Cell Interference Coordination,
MIMO: Multiple Input Multiple Output,
CE: Channel Estimation,
CSI: Channel State Information.
FB: Feed-Back.
CB: Code Block
TB: Transport Block
MI: Mutual Information
WMC: Weighted Metric Combining
CBMI: CB-based mutual information The methods and devices described herein may be based on resource blocks or resource block pairs, in particular resource blocks received from radio cells, and clusters. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in multi-layer heterogeneous networks. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes. These eNodeBs may commonly be referred to as macro eNodeBs or macro cells, pico eNodeBs or pico cells and femto/home eNodeBs or femto cells. Alternatively, the term "small cells" might be used as a broader term covering pico and femto cells.

The methods and devices described hereinafter may be applied in eICIC systems. The methods and devices described hereinafter may further be applied in ICIC based on Carrier Aggregation. ICIC based on Carrier Aggregation may enable an LTE-A UE to connect to several carriers simultaneously. It not only may allow resource allocation across carriers, it also may allow scheduler based fast switching between carriers without time consuming handover.

The methods and devices described hereinafter may be applied in interference aware receivers such as IRC (Interference Rejection Combining) receivers. IRC is a technique that may be used in an antenna diversity system to suppress co-channel interference by using the cross covariance between the noise in diversity channels. Interference rejection combining (IRC) may be used as an efficient alternative to increase uplink and downlink bit rates in areas where cells overlap. The interference rejection combining (IRC) receiver may be effective in improving the user throughput because it may suppress inter-cell interference. The IRC receiver may be based on a minimum mean square error (MMSE) criterion, which may require channel estimation and covariance matrix estimation including the inter-cell interference with high accuracy. The IRC receiver may also be based other receiver types such as non-linear ones.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

FIG. 1 is a schematic diagram of a heterogeneous network 100 including a macro cell 101 and pico cells 103, 105. The pico base stations 103, 105 may be characterized by substantially lower transmit power as compared to the macro base station 101. Due to the large disparity between the transmit power levels among the two type of base stations, the coverage 112, 114 of the pico base station 103, 105 is significantly more limited than the coverage 110 of the macro base station 101 as shown in FIG. 1. The larger coverage 110 of the macro cell 101 may attract more users 107, 109 towards high power macro eNodeB although there might not be enough resources to efficiently serve all user terminals. At the same time, the resources of smaller power base station may remain underutilized.

The UEs 107, 109 may include methods and/or devices for determining channel state information as described in the following in order to provide a better estimate for interference and signal quality and therefore increase data throughput in such environments.

Figure 2:
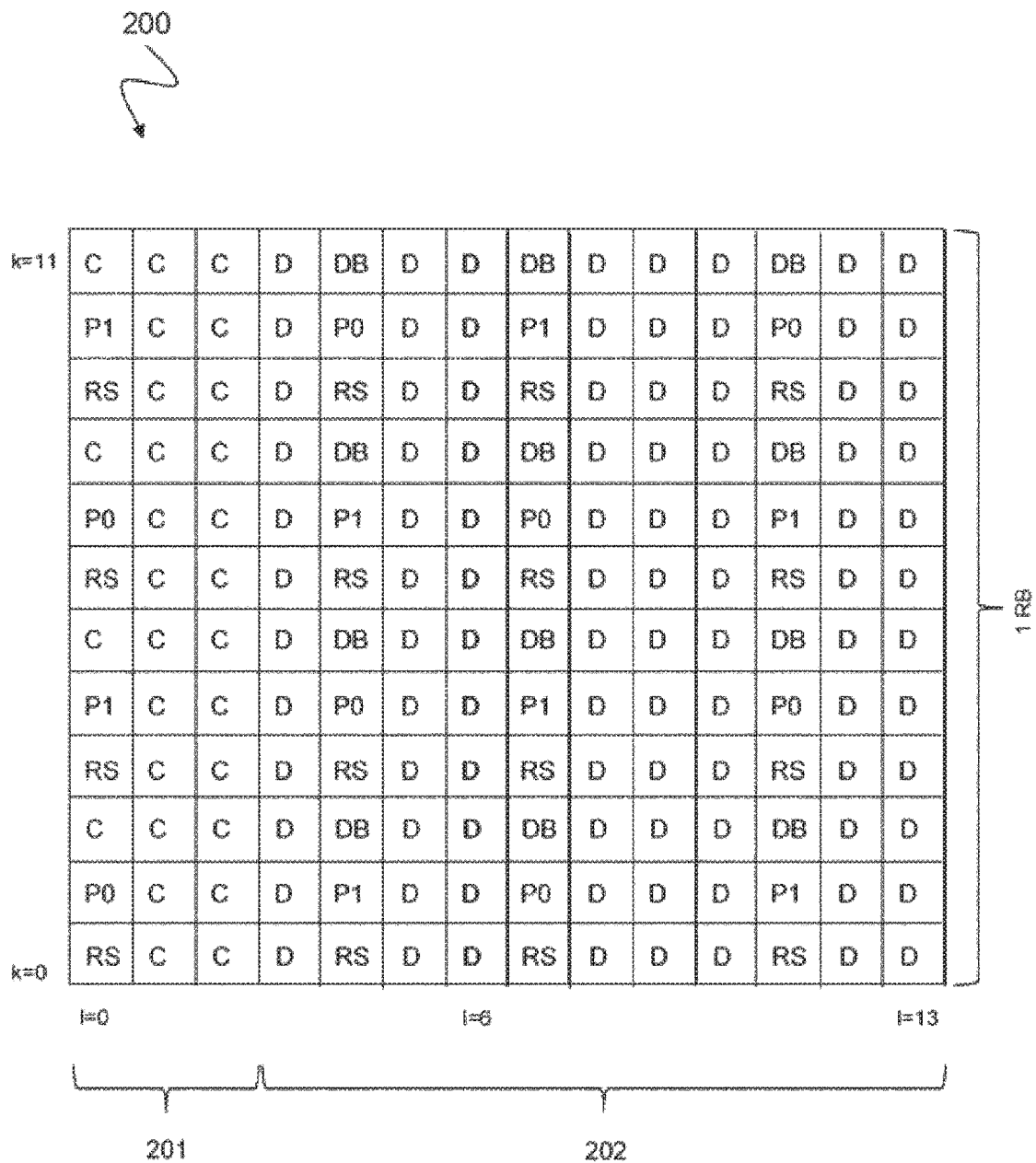
FIG. 2 is a schematic time-frequency representation of an exemplary resource block pair 200 that may be processed in a method or device according to the disclosure.

FIG. 2 is a schematic time-frequency representation of an exemplary resource block pair 200 that may be processed in a method or device according to the disclosure. The resource block pair 200 may include control and data symbols as well as reference symbols and data symbols interfered by reference symbols of neighbor cells. The resource block pair 200 may be structured as a two-dimensional grid carrying multiple resource elements which are represented by small squares forming the grid. The resource elements may be partitioned in a control region 201 comprising control resource elements C in the left section of the grid (from time samples l=0 to l=2) and in a data region 202 comprising data resource elements D in the right section of the grid (from time samples l=3 to l=13). Any other partitioning of a resource block pair 200 in a control region 201 and a data region 202 is possible, as well, in particular as determined by the mobile communication standard, e.g. LTE. In LTE, a resource block spans one time slot, i.e. a first resource block in FIG. 2 ranges from l=0 to l=6 while a second resource block in FIG. 2 ranges from l=7 to l=13. A resource block pair 200 as shown in FIG. 2 spans one subframe, i.e. two slots, for example ranging from l=0 to l=13 as shown in FIG. 2. As the term "resource block pair" 200 is a conceptual definition, in the following the term"resource block" is used even if indeed a resource block pair is specified.

Reference symbols RS, also called cell-specific reference symbols (CRS) or pilot symbols of the serving cell may be distributed over the grid in a regular fashion. The mobile device may use its knowledge about distribution of the reference symbols to perform channel estimation. Non-colliding cell-specific reference symbols (NC-CRS) P1 and P2 of other radio cells, i.e. interfering radio cells, may be distributed over the grid in a similar regular fashion. Non-colliding cell-specific reference symbols specify such symbols that do not collide with the cell-specific reference symbols RS of the serving radio cell. However, these non-colliding cell-specific reference symbols of other radio cells are interfering the data transmission between serving cell and mobile device, i.e. interfering the control resource elements C and the data resource elements D of the serving radio cell. Further data symbols DB may be located in time regions, i.e. OFDM symbols where the reference symbols RS are located.

Methods and devices as described in this disclosure may be applied in both, colliding and non-colliding interference scenarios. When the reference signals P0, P1 of other interfering cells do not coincide with the reference signals RS of the serving radio cell the interference scenario is denoted as "non-colliding". When the reference signals P0, P1 of other interfering cells coincide with the reference signals RS of the serving cell the interference scenario is denoted as "colliding". In particular, if the number of the collider ports exceeds the number of the serving cell ports the CRS of the interfering eNB interferes with data REs.

A transport block is constituted by a plurality of such resource blocks 200 depicted in FIG. 2. In particular, a plurality of resource blocks 200 having different frequency samples k constitute a transport block, for example frequency samples k=0, . . . 11; k=12, . . . 23; k=24, . . . 35; . . . . One transport block may be partitioned into a plurality of code blocks, where one code block may include a plurality of resource elements D, DB located in the data region 202. A first code block, for example, may include a specific number of resource elements, e.g. starting from a first resource element of a first time sample 11 and a first frequency sample k1 up to a second resource element of a second time sample 12 and a second frequency sample k2. All resource elements of the transport block in between the first resource element and the second resource element may belong to the first code block.

An exemplary partitioning of a transport block into code blocks is described below with respect to FIG. 5. Resource elements may be exclusive to one particular code block.

Figure 3:
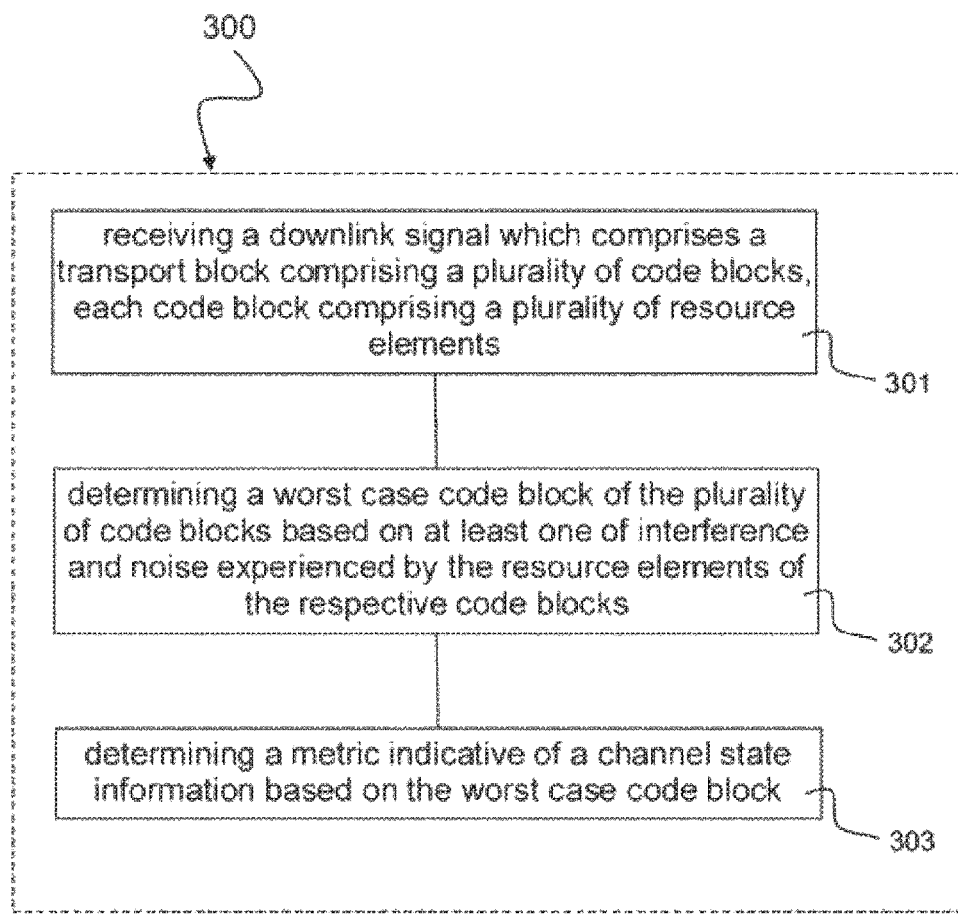
FIG. 3 is a schematic diagram of a method for determining channel state information based on a worst case code block.

FIG. 3 is a schematic diagram of a method 300 for determining channel state information based on a worst case code block. The method 300 includes receiving 301 a downlink signal, wherein the downlink signal comprises a transport block comprising a plurality of code blocks, each code block of the plurality of code blocks comprising a plurality of resource elements, e.g. a transport block including multiple resource blocks RB as described above with respect to FIG. 2. The method 300 includes determining 302 a worst case code block of the plurality of code blocks based on at least one of noise or interference experienced by the resource elements of the respective code blocks, e.g. a worst case code block 601 as described below with respect to FIG. 6. The method 300 includes determining 303 a metric indicative of a channel state information based on the worst case code block, e.g. a metric 611 based on the worst case code block 601 as described below with respect to FIG. 6.

The method 300 may include determining 302 the worst case code block as the code block of the plurality of code blocks for which a ratio of interfered resource elements of the code block is maximum. The metric may include mutual information based on an estimated signal quality of the downlink signal. The estimated signal quality of the downlink signal may be based on a post-detection signal to interference and noise ratio.

The method 300 may include determining the at least one of noise or interference experienced by the resource elements of a respective code block based on a predetermined configuration of the resource elements within the transport block, e.g. a configuration of the resource elements C, D, RS, DB, P0, P1 as described above with respect to FIG. 2. The configuration may depend on a specific serving cell or it may depend on a transmission mode, or other parameters of a mobile standard such as LTE. The configuration may depend on link quality feedback transmitted by a mobile terminal to a base station.

Interference strength is the main reason why code blocks may experience different block error rates resulting in a worst-case code block.

The method 300 may include grouping the resource elements of the worst case code block into groups, e.g. groups 402, 403, 404 as described below with respect to FIG. 4, according to at least one of noise or interference experienced by the resource elements of the worst case code block. The method 300 may include determining for each group a group-specific metric, e.g. a post-detection SINR $\gamma_0$, $\gamma_1$, $\gamma_2$ as described below with respect to FIG. 4 indicative of a signal quality of the resource elements of the respective group. The method 300 may include determining the metric based on a combination of the group-specific metrics. The group 401 is a separate group because it does not have data REs but is CRS. This group 401 may be used for signal estimation but may not be any of the RE groups carrying data REs for which FB shall give a quality assessment.

A signal quality of resource elements grouped in a first group 404 may lie within a first range and a signal quality of resource elements grouped in a second group 403 may lie within a second range that is different from the first range, e.g. as described below with respect to FIG. 4. It may as well of course happen that the interference strength is equal for two or more groups, e.g. due to temporary fluctuations in interference strength. The metric, i.e. the overall metric, may be determined based on weighted metric combining of the group-specific metrics, e.g. as described below with respect to FIG. 4.

The method 300 may include determining weights for the weighted metric combining based on a number of interference- and/or noise-affected resource elements in each group. The method 300 may include determining a first weight of a first group 403 as the number of resource elements in the first group 403 in the worst case code block divided by a number of resource elements in the worst case code block. The method 300 may include determining 302 the worst case code block of the plurality of code blocks based on a hypothesis of a transmitter-configured number of code blocks per transport block, e.g. as described below with respect to FIG. 6 or 7.

The method 300 provides an improved technique for feedback reporting providing higher throughput. The method 300 may be in particular applied in cases where some sub-blocks of data face higher interference level than the other sub-blocks, such that the sub-blocks with higher interference dominate the reception performance.

The act of determining 303 the metric indicative of channel state information of the method 300 may refer to the formulation of metric(s) that represent the channel or signal quality observed at a receiver in a communication system. The exact composition of channel state estimates may depend on the application, and may correspond to the highest achievable data-reception performance given a set of observed signals. One application of channel state estimates is link monitoring, whereby channel state estimates may be used to help the receiver decide in choosing an appropriate transmitter to connect with. Another application is link adaptation, whereby the transmit signal may be modified based on feedback of channel state estimates to enhance throughput performance.

Determining 302 the worst case code block may be based on at least one of noise or interference experienced by the resource elements. Interference condition at the observation signals for channel state estimation may differ from the condition at data signals of interest, when the observations are based on reference signals, or pre-defined non-data signals of known pattern. For instance, transmitters may employ distinct reference signals with non-overlapping frequency-time positions. If interfering transmitters are unloaded or partially loaded, the interference condition at some or all reference signals from the communicating transmitter may be different from the condition at data signals. This is a common scenario, since data signal may not be always available and reference signals are needed for many applications.

An exemplary channel state estimation solution for the uneven interference case is to group together subsets of data and reference signals corresponding to similar interference levels, and average the groups with weights that depend on the number of signals in the group and the estimated interference level at the group, e.g. as described below with respect to FIG. 4. Such grouping can be done for a standardized communication system, where possible locations of interfering signals are known. The interference level may be estimated by exploiting the known structure of intended and interfering reference signals and comparing their respective signal levels.

A further complication of determining channel state information may arise if a communication system employs layered channel coding, whereby a set or a block of transmitted signals is partitioned into multiple sub-blocks, each with its own reliability checking mechanism. Such a mechanism allows fast decision on the block reliability and thus faster HARQ (Hybrid Automatic Repeat reQuest) response. As an example, in 3GPP LTE (Long Term Evolution) systems, a transport block (TB) may comprise multiple code blocks (CB), each with its own CRC (Cyclic Redundancy Check). A CRC error at any of the member code blocks means CRC error of the entire transport block. The partitioning of a TB into code blocks may be such that only some of the CBs contain the interfering reference signals while others have none. With unloaded or partially loaded interferers, the reception performance of the interfered code blocks dominates the reception performance of the whole TB. This uneven interference among CBs in link adaptation applications imply that a recommended modification of transmit signal may entail changes in the number and the partitioning pattern of CBs from the observation. By applying a method 300 according to the disclosure where a worst case code block is determined 302 based on at least one of noise or interference and where the metric is determined 303 based on this worst case code block, estimation of channel state information can be significantly improved.

The channel state estimation techniques relying on a transport block for estimating the metrics provide too optimistic estimates in uneven interference cases, because they do not consider the impact of uneven interference levels among sub-blocks. The method 300 according to the disclosure provides metrics of higher accuracy because the effects of layered channel coding are considered due to the determining 303 of the metric based on the worst case code block.

The method 300 according to the disclosure may be characterized by the characteristic way of determining the feedback metrics. These FB metrics are calculated by estimating the performance of the worst case code-block. In the context of certain REs being subject to increased interference one way to do this would be e.g. to determine the worst case code-block by searching for the CB with the maximum ratio of interfered REs to the total number of REs; to determine FB metrics separately for interfered and non-interfered REs; and to determine the overall FB metric via combining these by weighting them according to their RE shares for the worst case CB (as opposed to using the RE shares with respect to the full TB).

Figure 4:
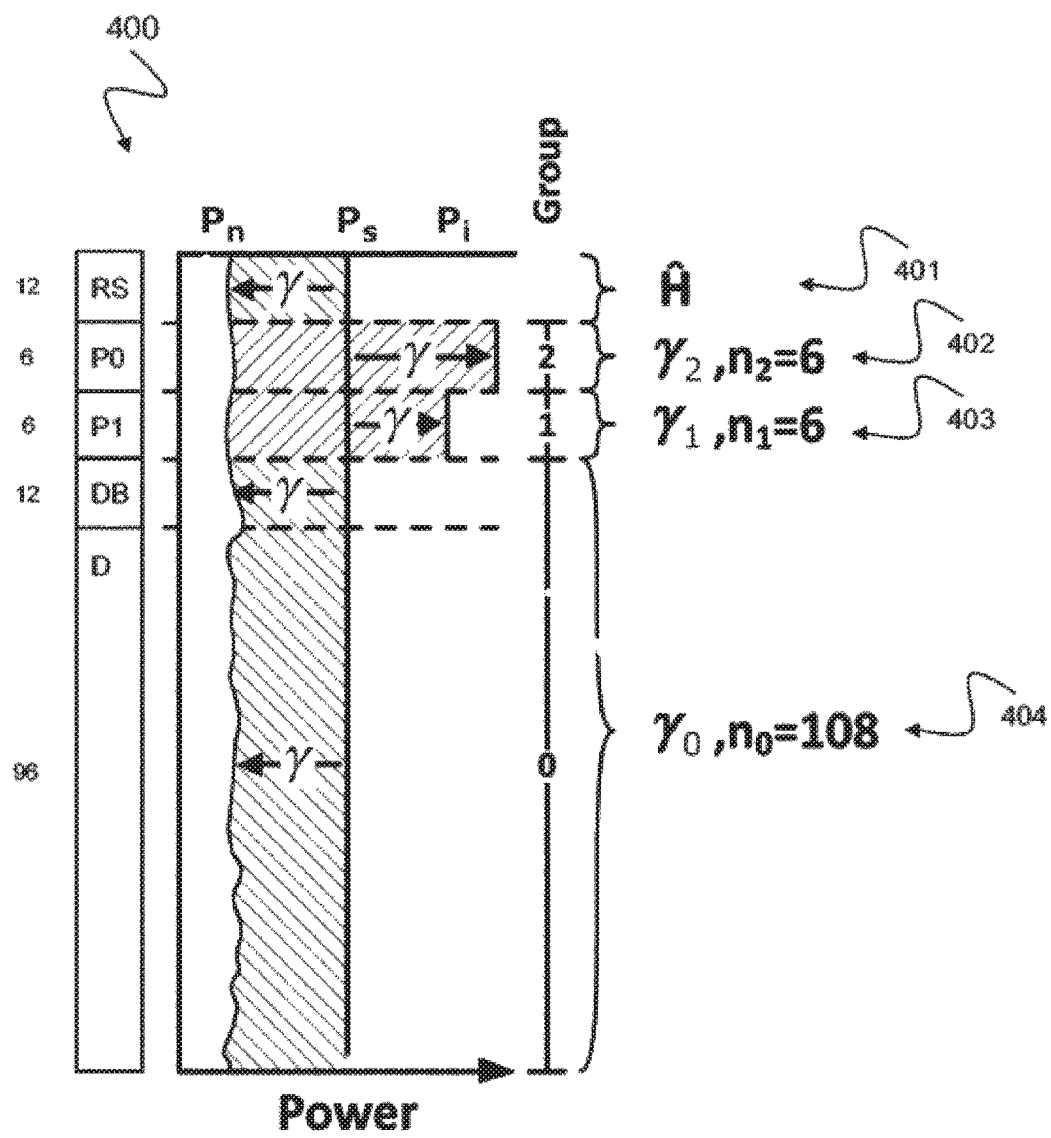
FIG. 4 is a schematic diagram illustrating a group classification scheme 400 of a resource block with respect to signal quality.

FIG. 4 is a schematic diagram illustrating a group classification scheme 400 of a resource block with respect to signal quality. The resource block may correspond to the resource block 200 as described above with respect to FIG. 2. The group classification scheme 400 may consider all resource elements of the data region 202 of a resource block 200 as described above with respect to FIG. 2. For example, in the data region 202 there are 12 cell-specific reference signal (of own cell or serving cell) resource elements RS, there are 12 resource elements of interfering cells P0, P1, there are 96 data symbols D and there are 12 further data symbols DB.

A first group 401 may include the 96 data symbols D and the 12 further data symbols DB. A second group 402 may include 6 resource elements of interfering cell P1. A third group 403 may include 6 resource elements of interfering cell P0. Further REs, that may include the 12 cell-specific reference signal (of own cell or serving cell) resource elements RS may not be grouped in a specific group. The three groups 401, 402, 403 are meant as pure exemplary, of course any other number of groups, for example 2, 4, 5, 6, 7, 8, 9, 10, etc. may be applied as well.

A metric of the first group 401 may be denoted as $\gamma_0$. A metric of the second group 402 may be denoted as $\gamma_1$. A metric of the third group 403 may be denoted as $\gamma_2$. The resource elements RS may be used for determining the estimated channel $\hat{H}$.

When computing the metric based on a transport block, all REs in an RB are assumed to experience the same type of noise & interference so that a single signal quality estimate can be used to be representative of all REs. If certain REs experience a significantly different type/strength of noise & interference, e.g. the groups 402, 403 depicted in FIG. 4, this needs to be considered for accurate FB reporting. FIG. 4 shows an example where some of the REs (of the groups 402, 403) experience extra interference. The whole set of REs may be divided into several (here 3) groups 401, 402, 403 where the signal quality is significantly different between groups but comparable for all REs within the same group.

One way to combine different downlink conditions follows the principle of weighted metric combining (WMC) where the mutual information (MI) for each group i is first calculated separately $I_i = f_2(\gamma_i)$, and thereafter, using weights $\psi_i$, combined to a single value $I = \Sigma_i \psi_i I_i$. The weights can be directly derived from the number $n_i$ of affected REs in each group $$\psi_i = \frac{n_i}{\sum_i n_i}.$$

In the example, the weights may be $\psi_i = \{^{108}/_{120}, ^{6}/_{120}, ^{6}/_{120}\} = \{0.90, 0.05, 0.05\}$, representing the percentage of affected REs for the whole transport block.

Figure 5:
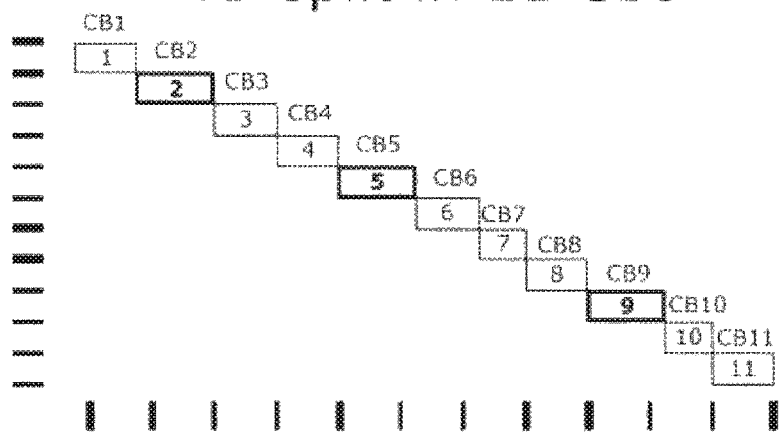
FIG. 5 is a schematic diagram illustrating an exemplary transmitter-initiated configuration of a transport block into a plurality of code blocks.

FIG. 5 is a schematic diagram illustrating an exemplary transmitter-initiated configuration 500 of a transport block into a plurality of code blocks. The basic resource block 501 may correspond to the resource block 200 described above with respect to FIG. 2. The whole transport block comprises a plurality of resource blocks RB arranged side by side with respect to the frequency axis. The transport block includes control blocks C including control symbols C, e.g. as illustrated in FIG. 2 above. The transport block includes data blocks D including data symbols D, e.g. as illustrated in FIG. 2 above. The transport block further comprises mixed blocks X including cell specific reference signal resource elements RS of the serving cell, resource elements of interfering cells P0, P1 and further data symbols DB, e.g. as described above with respect to FIG. 2.

Among the FB report metrics, CQI reports in particular are expected to give a recommendation for the choice of a modulation and coding scheme (MCS) on the downlink in order to achieve a target BLER of 10%, for example. This BLER refers to the error rate of transport block (TB) CRC fails. In LTE, a TB may span the REs in the data region 202 of a single subframe (SF) and—depending on the MCS—may consist of multiple code blocks (CB). In this case, each CB may be separately checked for CRC fail and the fail of a single CB may lead to a CRC fail of the entire TB.

If interference occurs that is clustered on REs of few or a single CB(s) as opposed to being spread across the whole TB, this may lead to significantly different BLERs among the CBs. In this case, the BLER of the worst case CB determines the BLER of the TB and it is this BLER that should be considered for FB purposes.

The example of FIG. 5 illustrates a case of LTE operating in a heterogeneous network scenario where a 20 MHz downlink is interfered by a "non-colliding" CRS (P0, P1 of FIG. 2) in an "almost blank subframe" (ABS). The downlink uses an exemplary MCS that splits the TB in 11 CBs, i.e. the code blocks CB1, CB2, CB3, CB4, CB5, CB6, CB7, CB8, CB9, CB10 and CB11, three of which are affected by the interference, in this example the code blocks CB2, CB5 and CB9 that include the blocks X of the transport block.

Looking at the ratios of interfered versus total REs it can be seen that in this example a TB-based share of interfered vs total REs is 12/120=10%; and a CB-based share of interfered vs total REs is ~4/8=50% with the obvious conclusion that FB reports being derived on a TB-basis might be too optimistic.

Methods and devices according to the disclosure are based on the idea to calculate FB reports using WMC with weights reflecting the worst case CB-based mutual information (CBMI) rather than TB-based ones. But of course the idea of this disclosure to look at the worst case code block instead of the transport block would apply to any other method as well.

Figure 6:
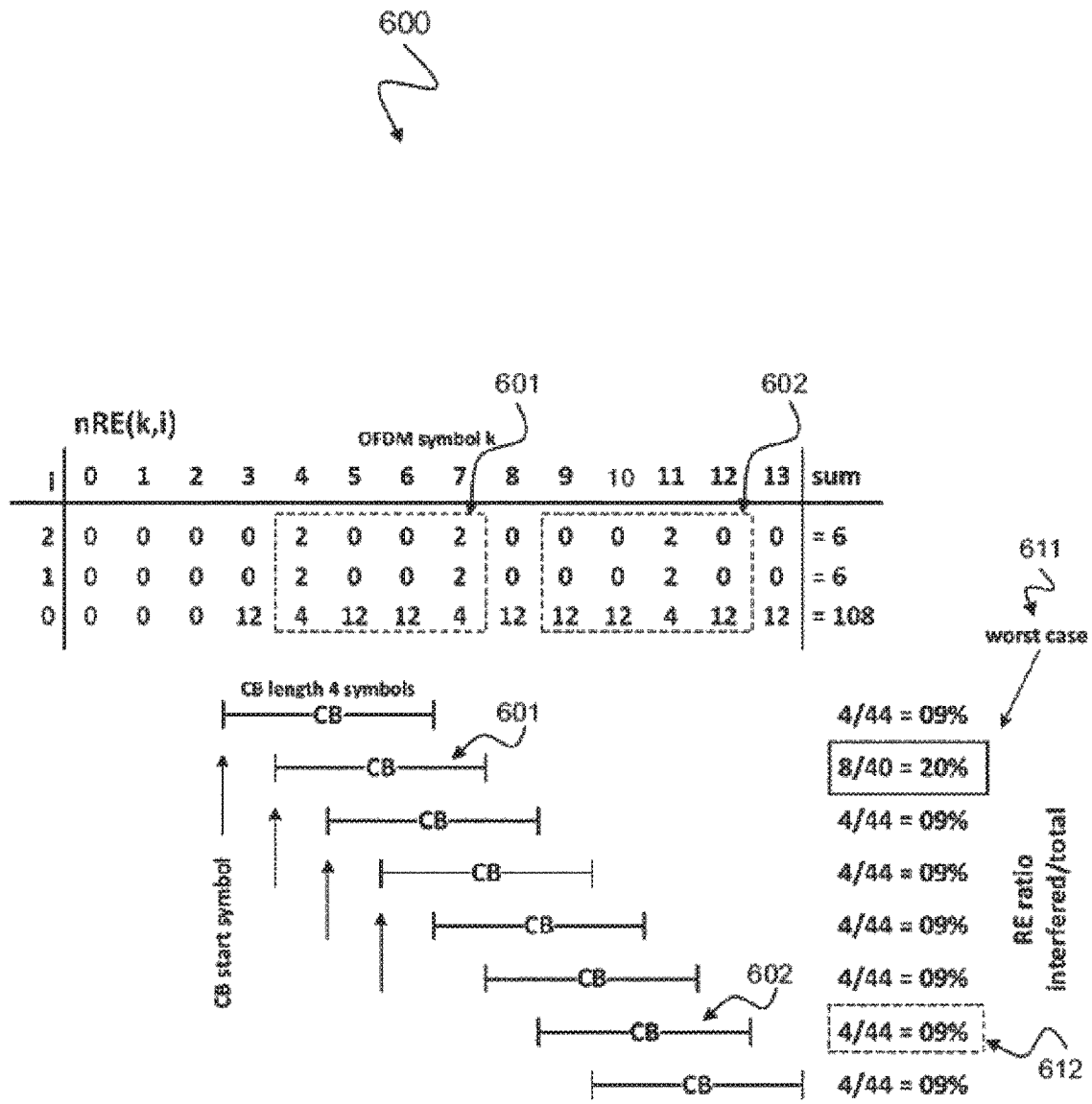
FIG. 6 is a schematic diagram illustrating an exemplary scheme 600 for determining a worst case code block in a transport block.

FIG. 6 is a schematic diagram illustrating an exemplary scheme 600 for determining a worst case code block 601 in a transport block. In the following a technique for dividing a transport block into different code block hypotheses 601, 602 resulting in different metrics 611, 612 is described. For simplification reasons, FIG. 6 shows an exemplary resource block, e.g. a resource block 200 as depicted in FIG. 2 or a resource block 501 as depicted in FIG. 5 instead of a full transport block that may include multiple resource blocks. A first code block 601 may correspond to a first metric 611; a second code block 602 may correspond to a second metric 612. The two hypotheses 601, 602 are meant as pure exemplary, of course any other number of hypotheses, for example 3, 4, 5, 6, 7, 8, 9, 10, etc. may be applied as well.

The first metric 611 may be obtained by adding the numbers in lines 2 and 1 of the first code block hypothesis 601, e.g. 2+2+2+2=8, providing a first result; by adding the numbers in lines 2, 1 and 0 of the first code block hypothesis 601, e.g. 2+2+2+2+4+12+12+4=40, providing a second result and dividing the first result by the second result, i.e. 8/40=20%. These numbers are numbers of REs per REgroup (row) and OFDM symbol (column). The ratio in fact is that of the number of interfered REs versus total REs for a CB assumed to start at a particular OFDM symbol.

The second metric 612 may be obtained by adding the numbers in lines 2 and 1 of the second code block hypothesis 602, e.g. 2+2=4, providing a first result; by adding the numbers in lines 2, 1 and 0 of the second code block hypothesis 602, e.g. 2+2+12+12+4+12=44, providing a second result and dividing the first result by the second result, i.e. 4/44=9%.

If FB is based on MI as core metric and WMC is used to combine multiple groups of REs experiencing different SINR conditions, then one possibility of achieving CB-based CSIFB is to derive weighting factors from the number of REs corresponding to the worst case CB, e.g. the code block with reference sign 601 in FIG. 6.

The number of CBs a TB is composed of cannot be simply derived from the current downlink configuration since it depends on the MCS which in turn might directly correspond to the UE's CQI report itself (assuming the eNB follows the UE's recommendations). The FB report shall preferably be independent of the currently used downlink configuration.

Thus, all potential CQI outcomes should be considered possible which means that for a given downlink bandwidth all potential numbers of CBs per TB should be determined and FB reports should be calculated for each hypothesis t in this set. The CQI outcome for each hypothesis should be checked for validity, meaning the resulting CQI recommendation should be within the CQI range associated with the assumed number of CBs per TB. If not all hypotheses are calculated but just a subset then the final result may be approximated, e.g. by means of MI interpolation between results "enclosing" the final outcome.

Assuming that WMC is used as a method to combine RE-groups experiencing separately determined signal quality, the main differentiator between the calculation of FB results for different hypotheses are different WMC weights $\psi_i^{(t)}$ resulting from different worst-case CB RE numbers $n_i^{(t)}$ $$I^{(t)} = \sum_i \psi_i^{(t)} I_i, \text{ with } \psi_i^{(t)} = \frac{n_i^{(t)}}{\sum_i n_i^{(t)}}$$

The following algorithm outlines an exemplary way to determine the WMC weights $\psi_i^{(t)}$ using some simplifications in order to keep the computational effort feasible.

1. Calculate the number of data REs per RBs conditioned on the current number of OFDM symbols per RB, the number of CRS ports and the size of the CFI region $$N_{RE,data}^{RB} = f(N_K^{SF}, N_{CFI}^{alloc}, N_{CRS}, CP_{ext}) = 120$$

2. Calculate the total number of DL data REs assuming a number of allocated RBs according to recent past allocations (alternative: use full bandwidth)

$$N_{RE,data}^{DL} = N_{RE,data}^{RB} N_{RB}^{alloc} = 120 \cdot 50 = 6000$$

3. Calculate the estimated number of information bits per RE for each CQI q assuming the eNB would follow UE CQI recommendations and conditioned on the CQI reference coderates and the modulation types associated with each CQI value.

$$r_q = \{78, 120, 193, 308, 449, 602, 378,$$
$$490, 616, 466, 567, 666, 772, 873, 948\}/1024$$

$$m_q = \{2, 2, 2, 2, 2, 2, 4, 4, 4, 6, 6, 6, 6, 6, 6\}$$

$$N_{info,q}^{RE} = r_q m_q$$
$$= \left\{ \begin{array}{l} 0.1523, 0.2344, 0.3770, 0.6016, 0.8770, 1.1758, 1.4766, \\ 1.9141, 2.4062, 2.7305, 3.3223, 3.9023, 4.5234, 5.1152, 5.5547 \end{array} \right\}$$

4. Calculate the total number of DL information bits for each CQI value $$N_{info,q}^{DL} = N_{RE,data}^{DL} N_{info,q}^{RE} = \{914, 1406, 2262, 3609,$$
$$5262, 7055, 8859, 11484, 14438, 16383, 19934,$$
$$23414, 27141, 30691, 33328\}$$

5. Calculate the number of codeblocks a DL transport block would be split into for each CQI given a known maximum number of information bits per codeblock $$N_{CB,q} = \left\lceil \frac{N_{info,q}^{DL}}{N_{info,max}^{CB}} \right\rceil = \{1, 1, 1, 1, 1, 2, 2, 2, 3, 3, 4, 4, 5, 5, 6\}$$

6. Calculate the unique set of CB splits (i.e. remove duplicates). These form the full set of potential CB MI hypothesis indexed t.

$$N_{CB,t} = \text{unique}(N_{CB,q}) = [1,2,3,4,5,6]$$

For each hypothesis t, corresponding to a specific number of CBs $N_{CB,t}$, there exists a set of CQIs $Q^{(t)}$ that contains all those CQIs q which, when configured in the DL, would lead to a split of the transport block into the same number of $N_{CB,t}$ code blocks.

$$Q^{(t)} = \{q | N_{CB,q} = = N_{CB,t}\}$$

7. For each CB hypothesis, from the corresponding set the lowest and highest CQIs are determined.

$$q_{min}^{(t)} = \min(Q^{(t)}) = \{1,6,9,11,13,15\},$$
$$q_{max}^{(t)} = \max(Q^{(t)}) = \{5,8,10,12,14,15\}$$

8. For each of the hypotheses the effective number of REs per RE-group used for the WMC weighting factor calculation are determined as follows (examples from hereon for $N_{CB,t} = 3$):

8a. For each considered hypothesis calculate the number of OFDM symbols a CB spans. In the following rounding up or down to integer values combined with a step-wise search is assumed $$N_{K,t}^{CB} = \frac{N_K^{SF} - N_{CFI}^{alloc}}{N_{CB,t}},$$

$$N_{K,t}^{CB} = \left\lceil \frac{N_K^{SF} - N_{CFI}^{alloc}}{N_{CB,t}} \right\rceil = \left\lceil \frac{11}{3} \right\rceil = 4,$$

$$N_{K,t}^{CB} = \frac{N_K^{SF} - N_{CFI}^{alloc}}{N_{CB,t}}$$

8b. Calculate the total number of interfered REs for each potential CB start symbol, each CB hypothesis t (meaning different numbers of symbols per CB) and each RE group $i_{IF}$.

$$N_{i_{IF},k,t} = \sum_{k'=k}^{k+N_{K,t}^{CB}-1} n'_{i_{IF},k'}, \forall k \in \{N_{CFI}^{alloc}, \ldots, (N_K^{SF} - N_{K,t}^{CB})\}$$

8c. Calculate the total number of interfered REs per start position and CB hypothesis.

$$N_{k,t}^{IF} = \sum_{i_{IF}>0} N_{i_{IF},k,t} = \{4, 8, 4, 4, 4, 4, 4, 4\}$$

8d. The worst case CB position (i.e. start symbol) is that with the highest ratio of interfered to total REs.

$$k_{wc,t} = \arg\max_k \left( \frac{N_{k,t}^{IF}}{N_{i_{IF}=0,k,t} + N_{k,t}^{IF}} \right)$$
$$= \arg\max_k \left( \left\{ \frac{4}{44}, \frac{8}{40}, \frac{4}{44}, \frac{4}{44}, \frac{4}{44}, \frac{4}{44}, \frac{4}{44}, \frac{4}{44}, \right\} \right)$$
$$= 4$$

8e. The new effective number of REs per RE-group is the RE-group specific RE count at the worst case position 601.

$$n''_{i_{IF}}{}^{(t)} = N_{i_{IF},k_{wc,t},t} = \{32,4,4\}$$

8f. The modified CB-based weighting factors then follow as $$n''_{all}{}^{(t)} = \sum_{\forall,i_{IF}} n''_{i_{IF}}{}^{(t)} = 40,$$

$$\psi_{i_{IF}}^{(t)} = \frac{n''_{i_{IF}}{}^{(t)}}{n''_{all}{}^{(t)}} = \left\{ \frac{32}{40}, \frac{4}{40}, \frac{4}{40} \right\} = \{0, 80, 0.10, 0.10\}$$

When using WMC, the impact of different interference in different RE-groups may be considered by two aspects: For each RE-group the interference strength/structure may be considered in a dedicated way when calculating the core metric (e.g. mutual information). So for each RE-group n there is a separate core metric, e.g. denoted as "I_n". Then, these may be weighted according to the RE-share of a particular group related to the total number of REs. These are the WMC weights, e.g. denoted as "W_n". WMC then combines everything doing a weighted sum over all "n" as "I_1*W_1+ . . . +I_n*W_n". "W_n" then is usually "N_n/(N_1+ . . . +N_n)". For WMC as such it is not important according to what criteria the groups were built. So whether or not a particular RE-group consists exclusively or just partly of interference affected REs is not relevant.

Figure 7:
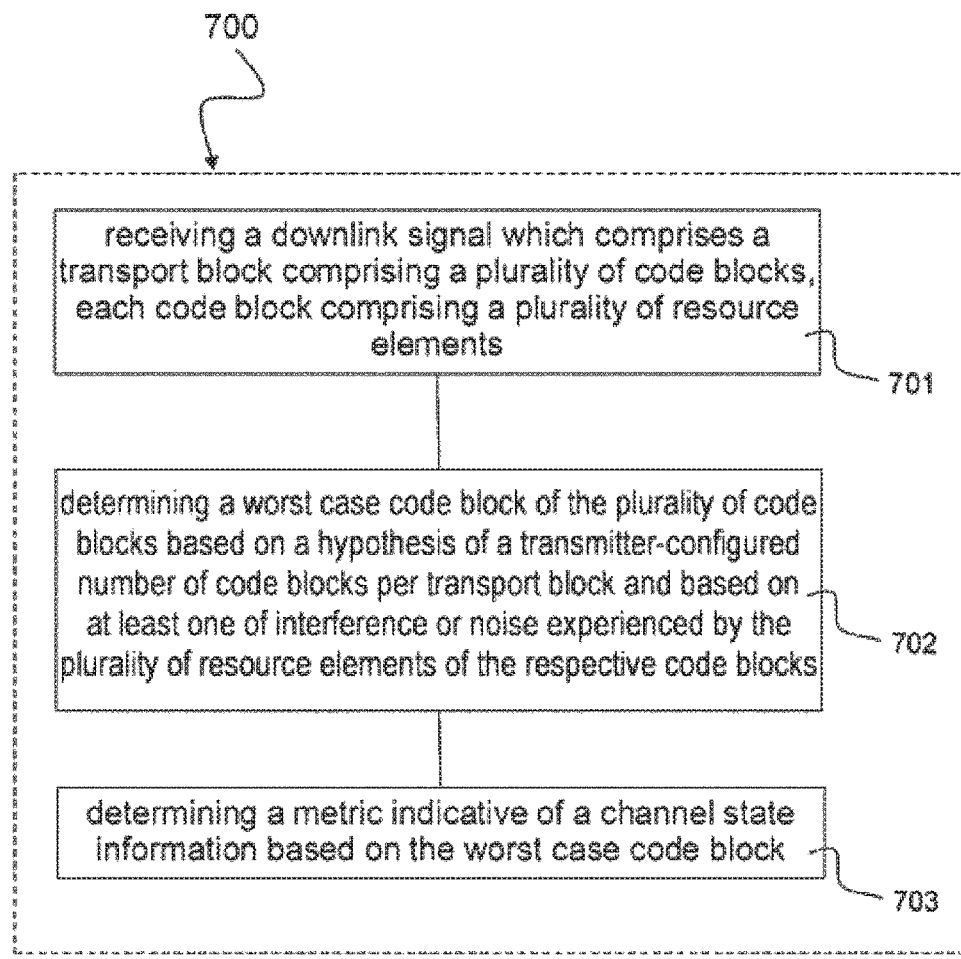
FIG. 7 is a schematic diagram of a method 700 for determining channel state information based on a hypothesis of a transmitter-configured number of code blocks and based on a worst case code block.

FIG. 7 is a schematic diagram of a method 700 for determining channel state information based on a hypothesis of a transmitter-configured number of code blocks and based on a worst case code block. The method 700 includes receiving 701 a downlink signal, wherein the downlink signal comprises a transport block comprising a plurality of code blocks, each code block of the plurality of code blocks comprising a plurality of resource elements arranged according to an orthogonal frequency division multiplex configuration, e.g. as described above with respect to FIG. 2 or FIG. 5. The method 700 includes determining 702 a worst case code block of the plurality of code blocks based on a hypothesis of a transmitter-configured number of code blocks per transport block and based on at least one of noise or interference experienced by the resource elements of the respective code blocks, e.g. as described above with respect to FIG. 6. The method 700 includes determining 703 a metric indicative of a channel state information based on the worst case code block, e.g. as described above with respect to FIG. 6.

The method 700 may include determining the hypothesis with respect to the transmitter-configured number of code blocks per transport block based on an evaluation of multiple hypotheses, each hypothesis relates to a specific number of potential numbers of code blocks per transport block, e.g. multiple hypotheses of code blocks 601, 602 as described above with respect to FIG. 6.

The hypothesis may indicate how many code blocks a transport block is split into. One hypothesis may be the assumption of splitting the TB in a particular number of CBs. One way to determine how many CBs a TB is split into would be, e.g., to assume a maximum allowed number of information bits per CB and relate this to the total number of information bits in the TB. The method 700 may include determining the worst case CB for each of the multiple hypotheses on a basis that the code blocks are contiguously located per transport block, e.g. a configuration with respect to FIG. 6 where a first code block of length 4 may start at OFDM symbol index 3, a second code block of length 4 may start at OFDM symbol 7, a third code block of length 3 may start at OFDM symbol 11. The method 700 may include an alternative way of determining the worst case CB for each of the hypotheses as described in the following example: determining the length of a CB for one particular hypothesis in number of symbols, then let the CB start at each possible OFDM symbol position, advancing one symbol for each new analysis of the RE ratios in order to find out the worst case position.

The method 700 may include determining the multiple hypotheses by determining a subset of the multiple hypotheses and interpolating over the subset to obtain the remaining hypotheses. A hypothesis may denote on how many CBs a TB is split into. In the following an exemplary explanation of the term "interpolating" is given. If, in principle, the TB could be split into 1, 2, 3, 4, 5, 6 CBs resulting in 6 hypotheses, for example, and one needs to determine a result for each of these hypotheses, one may decide to just determine results for a TB split into 1, 3 and 6 CBs, for example, and then, if necessary, interpolate before deriving the final result.

The method 700 may include determining 702 the worst case code block 601 for the hypothesis of the transmitter-configured number of code blocks per transport block as the code block for which a ratio of interfered resource elements of the code block is maximum. For example with respect to FIG. 6, the ratio 8/40=20% is maximum over all other ratios that are 4/44=9%.

The method 700 may include determining 703 the metric based on e.g. weighted metric combining with respect to the worst case code block 601, e.g. as described above by the algorithm with respect to FIG. 6.

Figure 8:
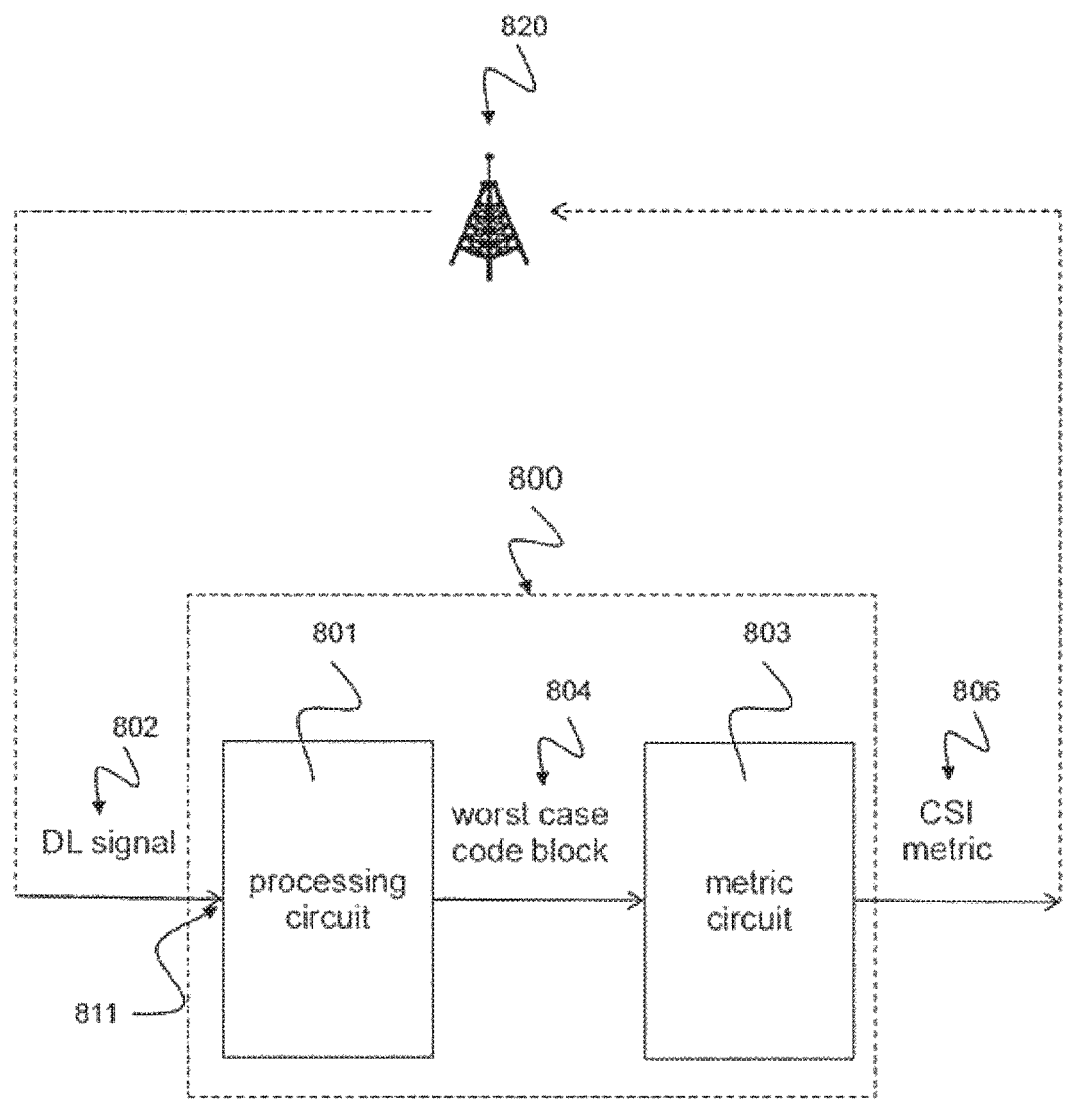
FIG. 8 is a schematic diagram of a device 800 for determining channel state information.

FIG. 8 is a schematic diagram of a device 800 for determining channel state information.

In communication systems, one way to improve the communication link is to have the receiver send feedback (FB) on the channel state information (CSI, 806) of the link back to the sender 820 in order to allow closed loop (CL) dynamic link adaptation (LA). CSI FB reporting 806 in LTE may include DL recommendations for rank (RI), precoding (PMI) and modulation and coding schemes (CQI) which may be used by the sender or transmitter 820 to optimize data transfer on the DL.

One way to determine these is by maximizing a metric such as the mutual information (MI) I which is derived from the estimated downlink signal 802 quality. This downlink signal quality may e.g. be the post-detection SINR γ being a function of the CRS channel estimate and an estimate of noise and interference.

$$\gamma = f_1(\text{wanted-signal,noise\&interference}). \quad I = f_2(\gamma)$$

For sending feedback (FB) on the channel state information (CSI, 806), the receiver may include a device 800 for determining channel state information as depicted in FIG. 8.

Such a device 800 includes a terminal 811 for receiving a downlink signal 802, wherein the downlink signal 802 comprises a transport block comprising a plurality of code blocks, each code block of the plurality of code blocks comprising a plurality of resource elements arranged according to an orthogonal frequency division multiplex configuration, e.g. a transport block including resource blocks 200 as described above with respect to FIG. 2 or a transport block as described above with respect to FIGS. 4, 5 and 6.

The device 800 includes a processing circuit 801 for determining a worst case code block 804 of the plurality of code blocks based on a hypothesis of a transmitter-configured number of code blocks per transport block and based on at least one of noise or interference experienced by the resource elements of the respective code blocks, e.g. as described above with respect to FIGS. 6 and 7.

The device 800 includes a metric circuit 803 for determining a metric 806 indicative of a channel state information based on the worst case code block 804, e.g. as described above with respect to FIGS. 2 to 7.

The hypothesis may indicate on how many code blocks a transport block is split into. One hypothesis may thus be the assumption of splitting the TB in a particular number of CBs. In that sense, determining the multiple hypotheses would follow from the possible total number of information bits etc. One way to determine how many CBs a TB is split into would be, e.g., to assume a maximum allowed number of information bits per CB and relate this to the total number of information bits in the TB.

The processing circuit 801 may be configured to group the resource elements of the worst case code block of each considered hypothesis 804 into groups according to at least one of noise or interference experienced by the resource elements of the worst case code block, e.g. as described above with respect to FIG. 4. The metric circuit 803 may be configured to determine for each group a group-specific metric, e.g. a group-specific metric 401, 402, 403 as described above with respect to FIG. 4, indicative of a signal quality of the resource elements of the respective group and to determine the metric 806 (i.e. the overall metric) based on a combination of the group-specific metrics.

The metric circuit 803 may be configured to determine the metric 806 based on weighted metric combining of the group-specific metrics, e.g. as described above with respect to FIG. 4.

The processing circuit 801 may be configured to determine the worst case code block 804 as the code block of the plurality of code blocks for which code block a ratio of interfered resource elements of the code block is maximum, e.g. as illustrated above with respect to FIG. 6.

Figure 9:
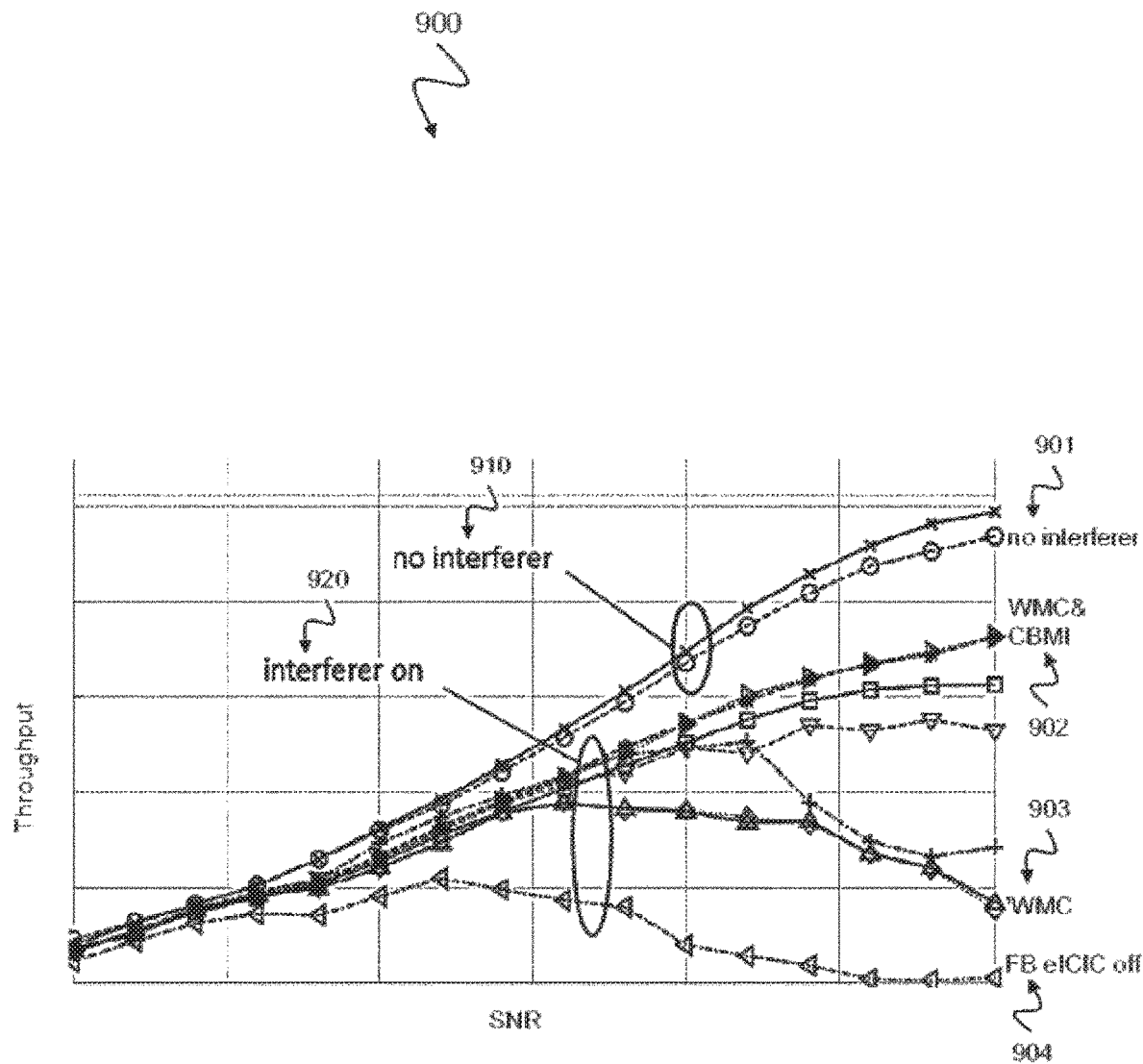
FIG. 9 is a performance diagram 900 illustrating throughput for code block based CSI versus transport block based CSI techniques.

FIG. 9 is a performance diagram 900 illustrating throughput for code block based CSI versus transport block based CSI techniques.

FB metric calculation is more accurate in scenarios where the downlink TB consists of multiple CBs and certain CBs are more affected by noise/interference than others.

This leads to higher throughput. The achievable performance gain is the higher the more CBs a TB is split into, the stronger the interference is and the more clustered the interference is.

The four labeled graphs 901, 902, 903, 904 indicate throughput for no interferer 901, i.e. without interference 910; FB eICIC off 904, i.e. with interference 920 but completely ignoring it for FB reporting; WMC 903, i.e. with interference 920 and considering its impact to the whole TB; and WMC&CBMI 902, i.e. with interference 920 and considering its impact on CB basis, i.e. according to the methods and devices of this disclosure.

FIG. 9 shows the improved throughput for the WMC&CBMI 902, i.e. according to the methods and devices of this disclosure.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods 300, 700 as described above with respect to FIGS. 3 and 7. Such a computer program product may include a readable storage medium storing program code thereon for use by a processor, the program code comprising instructions for performing any of the method 300, 700 as described above.

EXAMPLES

The following examples pertain to further embodiments. Example 1 is a method for determining channel state information, the method comprising: receiving a downlink signal, wherein the downlink signal comprises a transport block comprising a plurality of code blocks, each code block of the plurality of code blocks comprising a plurality of resource elements; determining a worst case code block of the plurality of code blocks based on at least one of noise or interference experienced by the plurality of resource elements of the respective code blocks; and determining a metric indicative of a channel state information based on the worst case code block.

In Example 2, the subject matter of Example 1 can optionally include determining the worst case code block as the code block of the plurality of code blocks for which code block a ratio of interfered resource elements of the code block is maximum.

In Example 3, the subject matter of any one of Examples 1-2 can optionally include that the metric comprises mutual information based on an estimated signal quality of the downlink signal.

In Example 4, the subject matter of Example 3 can optionally include that the estimated signal quality of the downlink signal is based on a post-detection signal to interference and noise ratio.

In Example 5, the subject matter of any one of Examples 1-4 can optionally include determining the at least one of noise or interference experienced by the resource elements of a respective code block based on a predetermined configuration of the resource elements within the transport block.

In Example 6, the subject matter of Example 5 can optionally include that the predetermined configuration of the plurality of resource elements within the transport block is indicative of the plurality of resource elements affected by at least one of different strength and structure of interference.

In Example 7, the subject matter of any one of Examples 1-6 can optionally include grouping the plurality of resource elements of the worst case code block into groups according to at least one of noise or interference experienced by the resource elements of the worst case code block; determining for each group a group-specific metric indicative of a signal quality of the plurality of resource elements of the respective group; and determining the metric based on a combination of the group-specific metrics.

In Example 8, the subject matter of Example 7 can optionally include that a signal quality of the plurality of resource elements grouped in a first group lies within a first range and a signal quality of the plurality of resource elements grouped in a second group lies within a second range that is different from the first range.

In Example 9, the subject matter of any one of Examples 7-8 can optionally include determining the metric based on weighted metric combining of the group-specific metrics.

In Example 10, the subject matter of Example 9 can optionally include determining weights for the weighted metric combining based on a number of the plurality of resource elements in each group.

In Example 11, the subject matter of Example 10 can optionally include determining a first weight of a first group as the number of the plurality of resource elements in the first group divided by a number of the plurality of resource elements in the worst case code block.

In Example 12, the subject matter of any one of Examples 1-11 can optionally include determining the worst case code block of the plurality of code blocks given for a particular hypothesis.

Example 13 is a method for determining channel state information, the method comprising: receiving a downlink signal, wherein the downlink signal comprises a transport block comprising a plurality of code blocks, each code block of the plurality of code blocks comprising a plurality of resource elements arranged according to an orthogonal frequency division multiplex configuration; determining a worst case code block of the plurality of code blocks based on a hypothesis of a transmitter-configured number of code blocks per transport block and based on at least one of noise or interference experienced by the plurality of resource elements of the respective code blocks; and determining a metric indicative of a channel state information based on the worst case code block.

In Example 14, the subject matter of Example 13 can optionally include determining the hypothesis with respect to the transmitter-configured number of code blocks per transport block based on an evaluation of multiple hypotheses, each hypothesis relates to a specific number of potential numbers of code blocks per transport block.

In Example 15, the subject matter of Example 13 or Example 14 can optionally include that the hypothesis indicates on how many code blocks a transport block is split into.

In Example 16, the subject matter of Example 14 can optionally include determining the multiple hypotheses on a basis that the code blocks are contiguously located within a transport block.

In Example 17, the subject matter of Example 14 can optionally include determining the multiple hypotheses by determining a subset of the multiple hypotheses and interpolating over the subset to obtain the remaining hypotheses.

In Example 18, the subject matter of any one of Examples 13-17 can optionally include determining the worst case code block for the hypothesis of the transmitter-configured number of code blocks per transport block as the code block of the plurality of code blocks for which code block a ratio of interfered resource elements of the code block is maximum.

In Example 19, the subject matter of any one of Examples 13-18 can optionally include determining the metric based on weighted metric combining with respect to the worst case code block.

Example 20 is a device for determining channel state information, comprising: a terminal for receiving a downlink signal, wherein the downlink signal comprises a transport block comprising a plurality of code blocks, each code block of the plurality of code blocks comprising a plurality of resource elements arranged according to an orthogonal frequency division multiplex configuration; a processing circuit for determining a worst case code block of the plurality of code blocks based on a hypothesis of a transmitter-configured number of code blocks per transport block and based on at least one of noise or interference experienced by the plurality of resource elements of the respective code blocks; and a metric circuit for determining a metric indicative of a channel state information based on the worst case code block.

In Example 21, the subject matter of Example 20 can optionally include that the processing circuit is configured to determine the worst case code block based on a hypothesis indicating on how many code blocks a transport block is split into.

In Example 22, the subject matter of any one of Examples 20-21 can optionally include that the processing circuit is configured to group the plurality of resource elements of the worst case code block into groups according to at least one of noise or interference experienced by the plurality of resource elements of the worst case code block; and that the metric circuit is configured to determine for each group a group-specific metric indicative of a signal quality of the plurality of resource elements of the respective group and to determine the metric based on a combination of the group-specific metrics.

In Example 23, the subject matter of Example 22 can optionally include that the metric circuit is configured to determine the metric based on weighted metric combining of the group-specific metrics.

In Example 24, the subject matter of any one of Examples 20-23 can optionally include that the processing circuit is configured to determine the worst case code block as the code block of the plurality of code blocks for which a ratio of interfered resource elements of the code block is maximum.

Example 25 is a computer readable medium on which computer instructions are stored which when executed by a computer, cause the computer to perform the method of any one of Examples 1 to 19.

Example 26 is a device for determining channel state information, the device comprising: means for receiving a downlink signal, wherein the downlink signal comprises a transport block comprising a plurality of code blocks, each code block of the plurality of code blocks comprising a plurality of resource elements; means for determining a worst case code block of the plurality of code blocks based on at least one of noise or interference experienced by the plurality of resource elements of the respective code blocks; and means for determining a metric indicative of a channel state information based on the worst case code block.

In Example 27, the subject matter of Example 26 can optionally include that the means for determining the worst case code block is configured to determine the worst case code block as the code block of the plurality of code blocks for which code block a ratio of interfered resource elements of the code block is maximum.

In Example 28, the subject matter of any one of Examples 26-27 can optionally include that the metric comprises mutual information based on an estimated signal quality of the downlink signal.

In Example 29, the subject matter of Example 28 can optionally include that the estimated signal quality of the downlink signal is based on a post-detection signal to interference and noise ratio.

In Example 30, the subject matter of any one of Examples 26-29 can optionally include means for determining the at least one of noise or interference experienced by the plurality of resource elements of a respective code block based on a predetermined configuration of the plurality of resource elements within the transport block.

In Example 31, the subject matter of Example 30 can optionally include that the predetermined configuration of the plurality of resource elements within the transport block is indicative of the plurality of resource elements affected by at least one of different strength and structure of interference.

In Example 32, the subject matter of any one of Examples 26-31 can optionally include means for grouping the plurality of resource elements of the worst case code block into groups according to at least one of noise or interference experienced by the plurality of resource elements of the worst case code block; means for determining for each group a group-specific metric indicative of a signal quality of the plurality of resource elements of the respective group; and means for determining the metric based on a combination of the group-specific metrics.

In Example 33, the subject matter of Example 32 can optionally include that a signal quality of the plurality of resource elements grouped in a first group lies within a first range and a signal quality of the plurality of resource elements grouped in a second group lies within a second range that is different from the first range.

In Example 34, the subject matter of any one of Examples 32-33 can optionally include means for determining the metric based on weighted metric combining of the group-specific metrics.

In Example 35, the subject matter of Example 34 can optionally include means for determining weights for the weighted metric combining based on a number of the plurality of resource elements in each group.

In Example 36, the subject matter of Example 35 can optionally include means for determining a first weight of a first group as the number of the plurality of resource elements in the first group divided by a number of the plurality of resource elements in the worst case code block.

In Example 37, the subject matter of any one of Examples 26-36 can optionally include that the means for determining the worst case code block is configured to determine the worst case code block of the plurality of code blocks based on a hypothesis of a transmitter-configured number of code blocks per transport block.

Example 38 is a system for determining channel state information, the system comprising: means for receiving a downlink signal, wherein the downlink signal comprises a transport block comprising a plurality of code blocks, each code block of the plurality of code blocks comprising a plurality of resource elements arranged according to an orthogonal frequency division multiplex configuration; means for determining a worst case code block of the plurality of code blocks based on a hypothesis of a transmitter-configured number of code blocks per transport block and based on at least one of noise or interference experienced by the plurality of resource elements of the respective code blocks; and means for determining a metric indicative of a channel state information based on the worst case code block.

In Example 39, the subject matter of Example 38 can optionally include means for determining the hypothesis with respect to the transmitter-configured number of code blocks per transport block based on an evaluation of multiple hypotheses, each hypothesis relates to a specific number of potential numbers of code blocks per transport block.

In Example 40, the subject matter of Example 39 can optionally include that the hypothesis indicates on how many code blocks a transport block is split into.

In Example 41, the subject matter of Example 39 can optionally include means for determining the multiple hypotheses on a basis that the code blocks are contiguously located per transport block.

In Example 42, the subject matter of Example 39 can optionally include means for determining the multiple hypotheses by determining a subset of the multiple hypotheses and interpolating over the subset to obtain the remaining hypotheses.

In Example 43, the subject matter of any one of Examples 38-42 can optionally include that the means for determining the worst case code block is configured to determine the worst case code block for the hypothesis of the transmitter-configured number of code blocks per transport block as the code block of the plurality of code blocks for which code block a ratio of interfered resource elements of the code block is maximum.

In Example 44, the subject matter of any one of Examples 38-43 can optionally include that the means for determining the metric is configured to determine the metric based on weighted metric combining with respect to the worst case code block.

In Example 45, the subject matter of Example 44 can optionally include means for weighted metric combining to determine the metric.

In Example 46, the subject matter of any one of Examples 38-45 can optionally include that the system is an on-chip system.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A method for determining channel state information, the method comprising:
   receiving a downlink signal, wherein the downlink signal comprises a transport block comprising a plurality of code blocks, each code block of the plurality of code blocks comprising a plurality of resource elements;
   determining a worst case code block of the plurality of code blocks based on at least one of noise or interference experienced by the plurality of resource elements of the respective code blocks, the worst case code block determined as the code block of the plurality of code blocks for which code block a ratio of interfered resource elements of the code block is maximum;
   determining a metric indicative of channel state information based on the worst case code block, the metric comprising mutual information based on an estimated signal quality of the downlink signal.

2. The method of claim 1, wherein the estimated signal quality of the downlink signal is based on a post-detection signal to interference and noise ratio.

3. The method of claim 1, further comprising:
   determining the at least one of noise or interference experienced by the plurality of resource elements of a respective code block based on a predetermined configuration of the plurality of resource elements within the transport block.

4. The method of claim 3, wherein the predetermined configuration of the plurality of resource elements within the transport block is indicative of the plurality of resource elements affected by at least one of different strength and structure of interference.

5. The method of claim 1, further comprising:
   grouping the plurality of resource elements of the worst case code block into groups according to at least one of noise or interference experienced by the plurality of resource elements of the worst case code block;
   determining for each group a group-specific metric indicative of a signal quality of the plurality of resource elements of the respective group; and
   determining the metric based on a combination of the group-specific metrics.

6. The method of claim 5, wherein a signal quality of the plurality of resource elements grouped in a first group lies within a first range and a signal quality of the plurality of resource elements grouped in a second group lies within a second range that is different from the first range.

7. The method of claim 5, comprising:
determining the metric based on weighted metric combining of the group-specific metrics.

8. The method of claim 7, comprising:
determining weights for the weighted metric combining based on a number of the plurality of resource elements in each group.

9. The method of claim 8, comprising:
determining a first weight of a first group as the number of the plurality of resource elements in the first group divided by a number of the plurality of resource elements in the worst case code block.

10. The method of claim 1, further comprising:
determining the worst case code block of the plurality of code blocks given for a particular hypothesis.

11. A system for determining channel state information, the system comprising:
means for receiving a downlink signal, wherein the downlink signal comprises a transport block comprising a plurality of code blocks, each code block of the plurality of code blocks comprising a plurality of resource elements arranged according to an orthogonal frequency division multiplex configuration;
means for determining a worst case code block of the plurality of code blocks based on a hypothesis of a transmitter-configured number of code blocks per transport block and based on at least one of noise or interference experienced by the plurality of resource elements of the respective code blocks, the means for determining the worst case code block configured to determine the worst case code block for the hypothesis of the transmitter-configured number of code blocks per transport block as the code block of the plurality of code blocks for which code block a ratio of interfered resource elements of the code block is maximum; and
means for determining a metric indicative of a channel state information based on the worst case code block, the metric comprising mutual information based on an estimated signal quality of the downlink signal.

12. The system of claim 11, comprising:
means for determining the hypothesis with respect to the transmitter-configured number of code blocks per transport block based on an evaluation of multiple hypotheses, each hypothesis relates to a specific number of potential numbers of code blocks per transport block.

13. The system of claim 12, wherein the means for determining a worst case code block is configured to determine the worst case code block based on a hypothesis indicating how many code blocks a transport block is split into.

14. The system of claim 12, comprising:
means for determining the multiple hypotheses on a basis that the code blocks are contiguously located per transport block.

15. The system of claim 12, comprising:
means for determining the multiple hypotheses by determining a subset of the multiple hypotheses and interpolating over the subset to obtain the remaining hypotheses.

16. The system of claim 12, wherein the means for determining the metric is configured to determine the metric based on weighted metric combining with respect to the worst case code block.

17. The system of claim 16, comprising:
means for weighted metric combining to determine the metric.

18. A device for determining channel state information, comprising:
a terminal for receiving a downlink signal, wherein the downlink signal comprises a transport block comprising a plurality of code blocks, each code block of the plurality of code blocks comprising a plurality of resource elements arranged according to an orthogonal frequency division multiplex configuration;
a processing circuit for determining a worst case code block of the plurality of code blocks based on a hypothesis of a transmitter-configured number of code blocks per transport block and based on at least one of noise or interference experienced by the plurality of resource elements of the respective code blocks, the worst case code block determined as the code block of the plurality of code blocks for which code block a ratio of interfered resource elements of the code block is maximum; and
a metric circuit for determining a metric indicative of a channel state information based on the worst case code block, the metric comprising mutual information based on an estimated signal quality of the downlink signal.

19. The device of claim 18, wherein the processing circuit is configured to determine the worst case code block based on a hypothesis indicating how many code blocks a transport block is split into.

20. The device of claim 19,
wherein the processing circuit is configured to group the plurality of resource elements of the worst case code block into groups according to at least one of noise or interference experienced by the plurality of resource elements of the worst case code block; and
wherein the metric circuit is configured to determine for each group a group-specific metric indicative of a signal quality of the plurality of resource elements of the respective group and to determine the metric based on a combination of the group-specific metrics.

21. A non-transitory computer readable medium on which computer instructions are stored which when executed by a computer, cause the computer to:
receive a downlink signal, wherein the downlink signal comprises a transport block comprising a plurality of code blocks, each code block of the plurality of code blocks comprising a plurality of resource elements;
determine a worst case code block of the plurality of code blocks based on at least one of noise or interference experienced by the plurality of resource elements of the respective code blocks, the worst case code block determined as the code block of the plurality of code blocks for which code block a ratio of interfered resource elements of the code block is maximum; and
determine a metric indicative of a channel state information based on the worst case code block, the metric comprising mutual information based on an estimated signal quality of the downlink signal.

22. The method of claim 1, wherein determining the worst case code block further comprises:
determining a resource element ratio that indicates a number of resource elements interfered with over a total number of resource elements by:
determining a length in symbols of a particular code block for a particular hypothesis;
letting the particular code block start at a symbol position for the particular hypothesis; and determining the resource element ratio in the particular code block;

advancing the particular code block by one symbol to form a new code block and determining the resource element ratio for the new code block; and repeating the advancing the particular code block and determining the resource element ratio until the transport block has been covered to find the worst case code block by determining the particular code block having a highest resource element ratio.

* * * * *